United States Patent [19]
> Gowans et al.

[11] 4,293,974
[45] Oct. 13, 1981

[54] ARM TO BLADE CONNECTOR

[75] Inventors: Neil A. Gowans, Buffalo; William C. Riester, Williamsville, both of N.Y.

[73] Assignee: Trico Products Corporation, Buffalo, N.Y.

[21] Appl. No.: 151,127

[22] Filed: May 19, 1980

[51] Int. Cl.³ .............................................. B60S 1/40
[52] U.S. Cl. .................................................. 15/250.32
[58] Field of Search ........................ 15/250.32–250.42

[56] References Cited

U.S. PATENT DOCUMENTS 3,576,044 4/1971 Besnard ............................ 15/250.32
4,127,912 12/1978 Deibel et al. ................. 15/250.32 X

FOREIGN PATENT DOCUMENTS 2331324 1/1974 Fed. Rep. of Germany ... 15/250.32

Primary Examiner—Peter Feldman
Attorney, Agent, or Firm—E. Herbert Liss

[57] ABSTRACT

A windshield wiper arm includes a free end which is U-shaped in cross section to form depending ears. The ears include slots open at the free end and detents adjacent the rear edges. The depending ears are received in an opening of the web of the central portion of a channel shaped blade and straddle a flat leaf spring. The open ended slots engage a cross pin extending through the webs of the blade and the detents engage the underside of the flat leaf spring to limit angular displacement of the blade relative to the arm. A pair of shoulders formed on the inner surfaces of the side walls of the blades engage the rear edge of the depending ears to restrict longitudinal movement of the arm relative to the blade.

7 Claims, 6 Drawing Figures

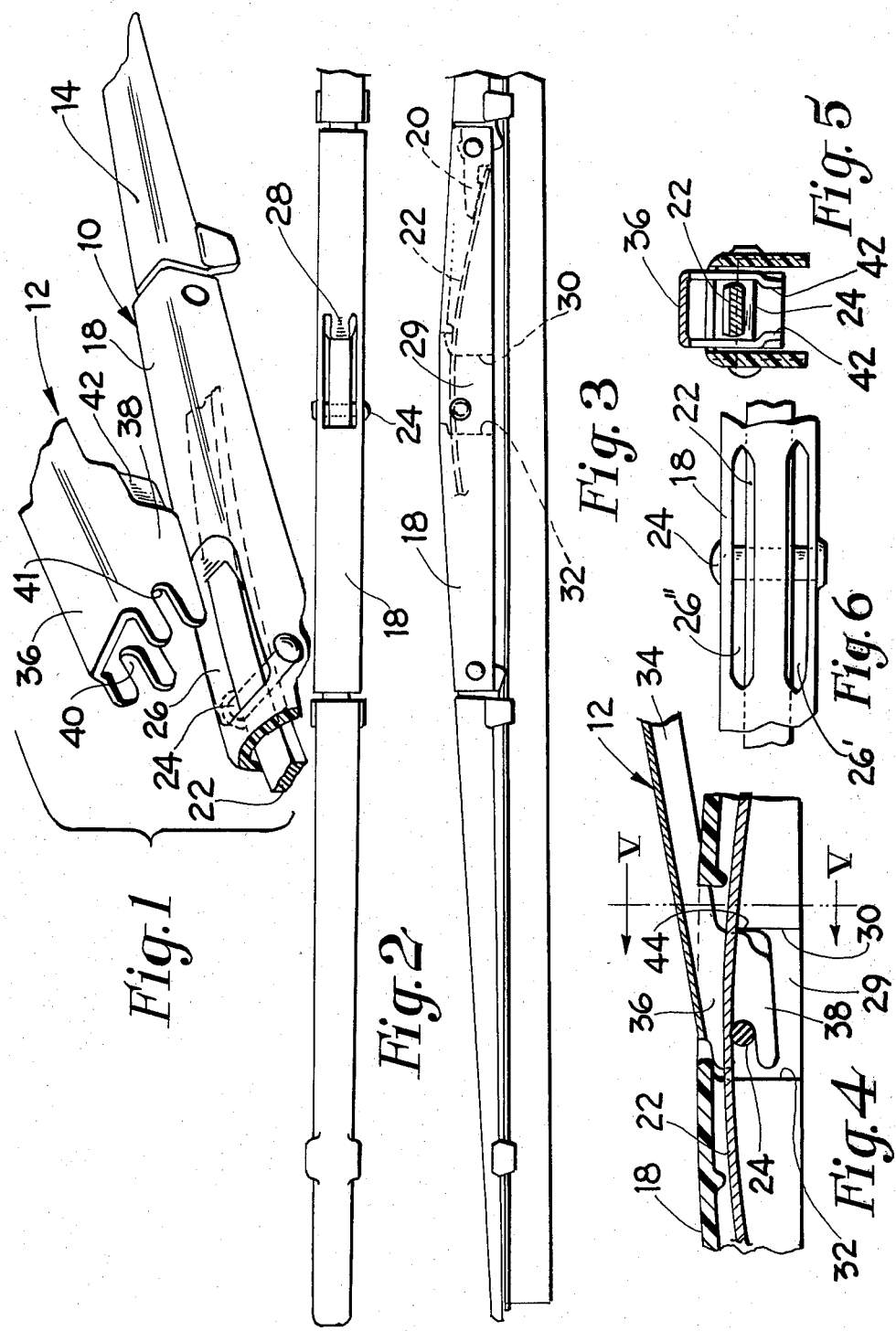

ARM TO BLADE CONNECTOR

BACKGROUND OF THE INVENTION

The invention relates to a windshield wiper arm and blade and, more particularly, to a connector assembly for connecting the arm to the blade.

There are many and diverse known types of arm to blade connectors. Some are similar to the connector assembly of the present invention. Improvements have been made in such connectors to lower the profile, to provide side mounting of the blade, and to simplify construction, and to simplify installation and removal of the blade while providing a firm, positive connection which precludes the arm from inadvertently being removed from the blade.

U.S. Pat. No. 3,576,044 to Besnard discloses an arm provided with a U-shaped outer end and an open ended slot in each leg of the end to engage a cross pin between the side walls of the wiper blade. A generally vertical, curved slot engages bosses formed internally on the side walls of the wiper blade for positive retention.

U.S. Pat. No. 4,177,537 to Roadarnel discloses a connector assembly in which the end of the arm is provided with a slot to engage a cross pin on a wiper blade and includes resilient legs which in operative assembly with the arm engage the upper edges of the side walls of the blade to limit rotation. When the cross pin on the blade engages the slot the blade is rocked to an operative position and cannot be inadvertently rotated to the installation and removal position.

The Roadarnel patent suffers from the disadvantage that it cannot be used with a blade of the type shown in U.S. Pat. No. 4,127,912 to Deibel wherein a flat leaf spring spans the center lever of a plastic blade to interrupt the opening through which the arm tip in inserted. The connector disclosed by Besnard requires bosses formed on the plastic to effect positive retention. In a plastic blade the life of the bosses would be limited by the rubbing contact between the metal and the plastic.

SUMMARY OF THE INVENTION

The improved connector of the present invention provides positive, firm retention between a wiper arm and a blade; it accomodates a blade of the type disclosed in the Deibel patent and obviates rapid wear of the positive retention detent which can occur from rubbing contact between metal and plastic. The blade of this invention has a central substantially rectangular opening on the top wall of a channel shaped lever which exposes a flat leaf spring held in position by a cylindrical cross pin underlying the leaf spring. The arm tip is U-shaped in cross section with a slot disposed in each leg opening outwardly to accomodate the cross pin. The internal surface of the side walls of the blade in the area of the cross pin are rectangularly recessed forming internal shoulders on each side wall which engage the inner edges of the legs of the arm tip to prevent the cross pin from being displaced from the slot when the arm and blade are in operative position. Further an internal boss is provided on each leg of the arm tip. In assembled position the armtip straddles the flat spring and the bosses serve as detents engaging the underside of the flat spring to prevent inadvertent displacement if the arm and blade should be lifted from the shield as can occur for example in a car wash.

The principle object of the present invention is to provide a simple, effective arm to blade connection which assures positive blade retention and simplified installation and removal together with a low profile and pleasing appearance.

Another object of the invention is to provide an arm to blade connector assembly adapted for use with a plastic blade which includes a metal to metal detent to thereby eliminate rapid wearing of the plastic parts.

Other objects and advantages of the invention will be apparent from the following detailed description taken in connection with the accompanying drawings.

BRIEF DESCRIPTION OF THE DRAWINGS

FIG. 1 is an exploded fragmentary perspective view illustrating the arm and blade connector of the invention;

FIG. 2 is a fragmentary top elevational view;

FIG. 3 is a fragmentary side elevational view;

FIG. 4 is a longitudinal cross section taken on lines IV—IV of FIG. 2 with arm attached;

FIG. 5 is a transverse sectional view taken on line V—V of FIG. 4; and

FIG. 6 is a fragmentary top elevational view of a modified embodiment of the invention.

DETAILED DESCRIPTION

Referring to the drawings, a wiper blade superstructure 10 and a wiper arm 12 are shown. The wiper blade superstructure 10 comprises a pair of end levers 14 and 16 pivotally connected to opposite ends of a center lever 18. The levers are preferably of plastic material. The inner end portion 20 of each end lever is telescopically received within the center lever 18. A flat leaf spring 22 spans the center lever. Each end portion 20 engages the upper surface of an end of spring 22 as seen in FIG. 3 thereby retaining it in position. The center lever 18 is channel shaped in cross section comprising a web and depending side walls; it has a central generally rectangular opening 26 in the central portion of the web which exposes the central portion of the spring 22. A cross pin 24 extends transversely from web to web and underlies the center portion of spring 22 thereby retaining it in position. The cross pin 24 may be disposed closer to one end of the rectangular opening. The end of the rectangular opening remote from the cross pin 24 is ramped to the surface of the web of the center lever 18 as at 28 to provide clearance so that a low profile assembly results. The internal surface of the side walls of the center lever are internally recessed as at 29 to form shoulders 30 and 32 near each end of the rectangular opening 26 for a purpose to be hereinafter explained. The arm 12 comprises a mounting portion (not shown) for attaching the arm to a pivot shaft and an arm extension 34 pivoted to the mounting portion on a transverse axis (not shown) terminating in an arm tip 36, U-shaped in cross section, forming depending ears 38. The depending ears each have a slot 40 open at the free end of the arm tip for accomodating the cross pin 24 of the blade. Depressions 42 are formed in each ear 38 at the lower inner end and project inwardly in opposition to each other.

To connect the arm to the blade the blade is disposed at an angle so that the ears 38 can be inserted into the rectangular opening 26 which serves as aperture means for receiving the depending ears with the cross pin thrust into the slot 40 until the pin 24 engages the closed end 41 of the slot. The blade is then rocked toward the arm. The ears 38 straddle the flat spring 22. The ears are sufficiently resilient to permit the depressions 42 which serve as detent means to ride over the edge of the flat spring 22 which serves as a strike for the detent means. The detent means engages the underside of the strike. The ears 38 enter the rectangular recesses 29 in the sidewalls of the center lever 18, the rear edges 44 serving as shoulder means abutting the shoulder 30 formed in the blade by the recesses in the side walls; thus the blade is held in position by the engagement of the closed ends 41 of the slots 40 with the cross pin and the engagement of the rear edges 44 of the ears with the shoulders 30. The angular movement of the blade relative to the arm is limited by engagement of the depressions 42 with the underside of the spring 22. Thus the blade is retained for limited pivotal movement relative to the arm. Removal of the blade is accomplished by rotating the inner portion of the blade outward relative to the arm until the detents 42 ride over the edge of the spring 22 permitting disengagement of the slot from the cross pin 24.

In the embodiment of the invention shown in FIG. 6 the aperture means for receiving the depending ears 38 comprises a pair of parallel slots 26 which may be formed in the web of the center lever 18 adjacent the webs. The slots 26' each extend longitudinally of the web from the cross pin 24 toward opposite ends of the blade. The internal recesses 29 in the legs of the center lever in this embodiment are near to the ends of the slots 26' and form shoulders 30 near each end of the slots 26' on the side walls. This embodiment permits the attachment of a blade to the arm from either side of the pin and reduces the open area of the web. In this embodiment the ears 38 will straddle the space between the slots.

In accordance with the broader aspects of the invention, the slots 26' of the FIG. 6 embodiment may extend in only one direction longitudinally from the pin. Furthermore the rectangular opening in the embodiment of FIG. 1 may extend longitudinally in opposite directions from the cross pin 24.

It will be apparent that an improved arm to blade connector has been provided which can accomodate a blade having a flat spring spanning the center yoke which is simple and economical to manufacture, which facilitates installation and removal of the blade and which provides for positive retention and extended life of the components.

Although certain specific embodiments of the invention have been shown and described for the purpose of illustration it will be apparent that in accordance with the broader aspects of the invention various modifications and other embodiments are possible within the scope of the invention. For example other and different types of blade superstructures may be used in which other types of anchoring members may be employed between the webs of the center lever to engage detent means on the arm tip. The arm and blade superstructure may be of various suitable or desirable materials. The levers of the superstructures may be arranged in a different manner. It is to be understood, therefore, that the invention is not limited to the specific arrangements shown but in its broadest aspects it includes all equivalent embodiments and modifications which come within the scope of the invention.

We claim:

1. A connector assembly for connecting a windshield wiper arm and a windshield wiper blade, said arm having a free end U-shaped in cross section, forming depending ears, a slot in each of said depending ears, said slot being open at the free end of said arm tip, said wiper blade having a channel-shaped central portion with depending side walls connected by a web at the upper edge of said side walls, elongate longitudinally extending aperture means extending over a central portion of said web for receiving said depending ears and a cross pin exposed to said aperture means for receiving said slots; characterized in that a strike is disposed intermediate the side walls exposed to said aperture means, detent means are positioned on said ears disposed for engagement with said strike, said ears include shoulder means positioned to engage an abutting part of said blade for limiting longitudinal movement of the blade relative to the arm when in operative position.

2. A connector assembly according to claim 1 characterized in that said strike comprises a flat leaf spring underlying said cross pin and spanning said aperture.

3. A connector assembly according to claim 1 characterized in that said detent means comprises a depressed portion on said depending ears extending internally in opposed relation.

4. A connector assembly according to claim 1 wherein said shoulder means comprises the rear edge of each of said depending ears and said abutting part comprises an internal shoulder on each of said side walls.

5. A connector assembly according to claim 1 wherein said aperture means comprise a pair of longitudinally extending slots transversely spaced apart, positioned to accomodate said depending ears.

6. A connector assembly according to claim 1 characterized in that the major portion of said aperture means extends in one direction longitudinally from said pin whereby a blade designed for directional installation can only be installed in the designed direction.

7. A connector assembly according to claim 1 wherein said aperture extends longitudinally in opposite directions from said pin whereby a symmetrically designed blade can be installed from either direction.

* * * * *